(12) United States Patent
Tanaka et al.

(10) Patent No.: US 12,139,255 B2
(45) Date of Patent: Nov. 12, 2024

(54) CONTROL SYSTEM, CONTROL METHOD, AND INFORMATION STORAGE MEDIUM FOR UNMANNED AERIAL VEHICLE

(71) Applicant: RAKUTEN GROUP, INC., Tokyo (JP)

(72) Inventors: Daiki Tanaka, Tokyo (JP); Toshiaki Tazume, Tokyo (JP); Takayoshi Inuma, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 250 days.

(21) Appl. No.: 17/743,468

(22) Filed: May 13, 2022

(65) Prior Publication Data

US 2022/0363383 A1    Nov. 17, 2022

(30) Foreign Application Priority Data

May 17, 2021  (JP) .................................. 2021-083095

(51) Int. Cl.
| | |
|---|---|
| B64C 39/02 | (2023.01) |
| B64D 47/02 | (2006.01) |
| B64U 101/20 | (2023.01) |
| B64U 101/30 | (2023.01) |
| G01V 1/01 | (2024.01) |
| G05D 1/00 | (2024.01) |
| G06V 20/17 | (2022.01) |

(52) U.S. Cl.
CPC ............ *B64C 39/024* (2013.01); *B64D 47/02* (2013.01); *G05D 1/1062* (2019.05); *G06V 20/17* (2022.01); *B64U 2101/20* (2023.01); *B64U 2101/30* (2023.01); *G01V 1/01* (2024.01)

(58) Field of Classification Search
CPC ....... B64D 47/02; B64D 45/00; F21S 41/125; B64C 39/024; G10L 13/00; G01N 21/00; B64U 70/93; H04M 11/00; G08B 25/10; G08B 21/02; G08G 5/0039; B60Q 1/324
See application file for complete search history.

(56) References Cited

U.S. PATENT DOCUMENTS

| | | | |
|---|---|---|---|
| 11,056,000 B2* | 7/2021 | Lamkin ................. | B64D 45/00 |
| 2011/0260848 A1* | 10/2011 | Rodriguez Barros . | B60Q 1/324 340/438 |
| 2015/0325064 A1* | 11/2015 | Downey ............. | G08G 5/0039 701/29.3 |
| 2017/0069189 A1* | 3/2017 | Corum .................... | G08B 21/02 |
| 2018/0160316 A1* | 6/2018 | Byrne .................... | G08B 25/10 |
| 2018/0228448 A1* | 8/2018 | Miyazawa ............. | H04M 11/00 |
| 2019/0028904 A1* | 1/2019 | Carpenter .............. | B64U 70/93 |
| 2019/0204189 A1* | 7/2019 | Mohr, Jr. ............... | G01N 21/00 |
| 2019/0297438 A1* | 9/2019 | Miyawaki .............. | G10L 13/00 |
| 2021/0192629 A1* | 6/2021 | Tofte ..................... | B64C 39/024 |
| 2021/0262630 A1* | 8/2021 | Jha ........................ | F21S 41/125 |

* cited by examiner

*Primary Examiner* — Yuri Kan
(74) *Attorney, Agent, or Firm* — HEA LAW PLLC

(57) ABSTRACT

A control system acquires predicted tsunami information, and generates a flight plan for unmanned aerial vehicles. The flight plan includes flight paths along safety boundaries between an expected damage area and a safe area. The expected damage is an area expected to be damaged by the tsunami indicated by the predicted tsunami information. The safe area is an area to be safe from damage caused by the tsunami. The control system transmits the flight plan to the unmanned aerial vehicles.

16 Claims, 17 Drawing Sheets

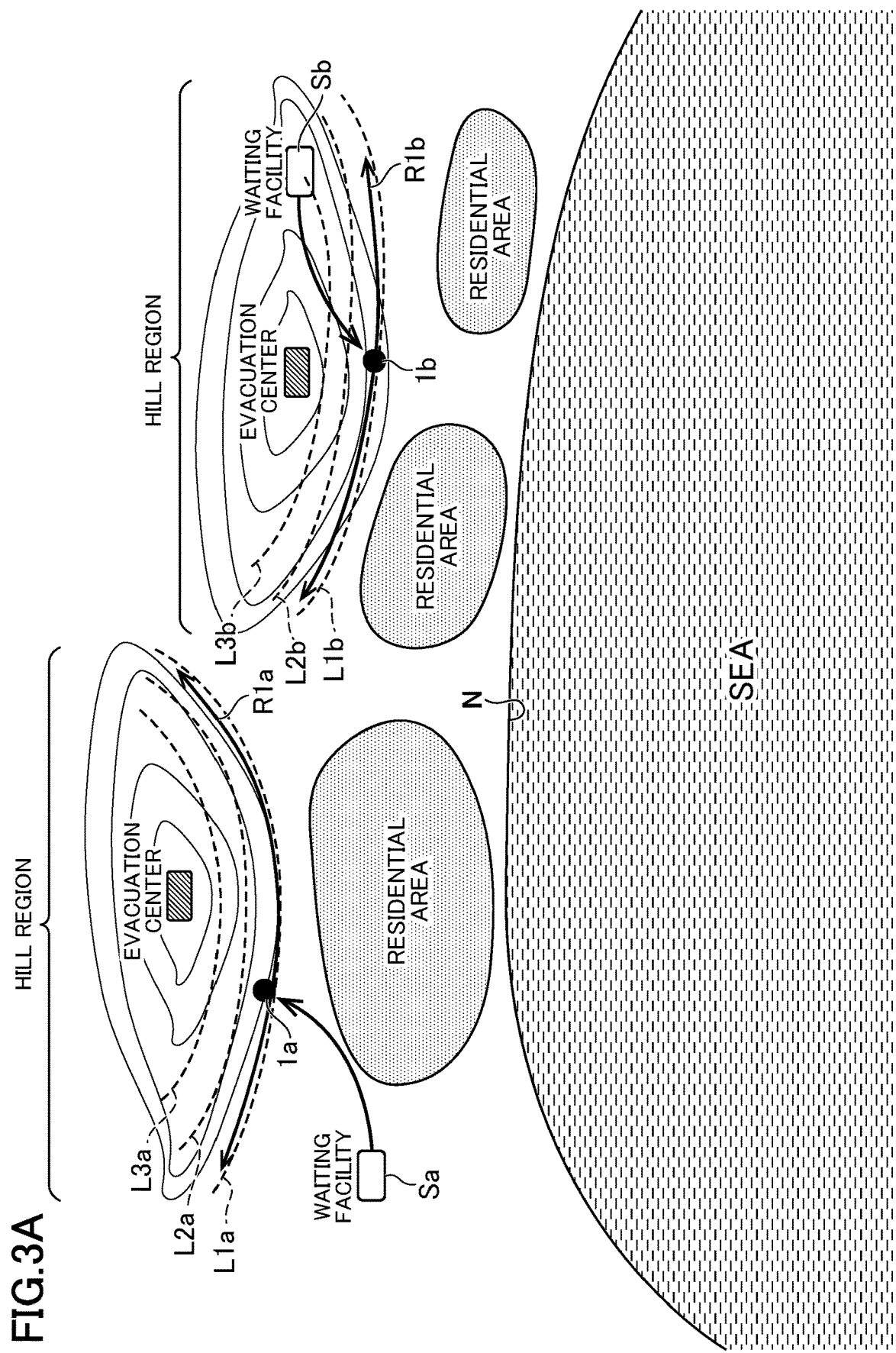

FIG.5A

FLIGHT PATH BASIC INFORMATION

BOUNDARY WAYPOINT LIST OF FLIGHT PATH R1a

BOUNDARY WAYPOINT LIST OF FLIGHT PATH R2a

BOUNDARY WAYPOINT LIST OF FLIGHT PATH R3a

| | LATITUDE | LONGITUDE | ALTITUDE | SPEED | MESSAGE ID | MESSAGE ID | MESSAGE ID |
|---|---|---|---|---|---|---|---|
| FORWARD PATH | 35.6000 | 139.700 | 20 | 2.0 | 101 002 071 | | |
| | 35.6101 | 139.702 | 20 | 2.0 | 101 002 071 | ... | ... |
| | ... | ... | ... | ... | ... | ... | ... |
| | ... | ... | ... | ... | ... | ... | ... |
| | 35.6003 | 139.706 | 20 | 1.0 | 101 002 071 | ... | ... |
| | 35.6004 | 139.708 | 20 | 1.0 | 101 002 071 | PRIORITY FLIGHT RANGE | |
| | 35.6005 | 139.708 | 20 | 1.0 | 101 002 071 | ... | ... |
| | ... | ... | ... | ... | ... | ... | ... |
| REVERSE PATH | ... | ... | ... | ... | ... | ... | ... |
| | 35.6001 | 139.702 | 20 | 2.0 | 101 002 071 | ... | ... |
| | 35.6000 | 139.700 | 20 | 2.0 | 101 002 071 | ... | ... |

FIG.5B

TSUNAMI SCALE-TO-FLIGHT PATH INFORMATION

| AREA | TSUNAMI SCALE | FLIGHT PATH ID |
|---|---|---|
| COAST OF ABC PREFECTURE | SMALL SCALE | R1a |
| | MEDIUM SCALE | R2a |
| | LARGE SCALE | R3a |
| COAST OF DEF PENINSULA | SMALL SCALE | R1b |
| | MEDIUM SCALE | R2b |
| | LARGE SCALE | R3b |
| COAST OF NORTHERN PART OF GHI REGION | SMALL SCALE | R1c |
| | MEDIUM SCALE | R2c |
| | LARGE SCALE | R3c |
| ... | ... | ... |
| | ... | ... |
| | ... | ... |

FIG.5C

FLIGHT PATH BASIC INFORMATION

INTER-REGIONAL WAYPOINT LIST OF DEF RESIDENTIAL AREA

INTER-REGIONAL WAYPOINT LIST OF GHI COMMERCIAL AREA

| LATITUDE | LONGITUDE | ALTITUDE | SPEED | MESSAGE ID | EED | MESSAGE ID |
|---|---|---|---|---|---|---|
| 35.601 | 139.700 | 20 | 2.0 | 101 002 | | |
| 35.601 | 139.704 | 20 | 2.0 | 101 002 | | ... |
| 35.601 | 139.708 | 20 | 2.0 | 101 002 | | ... |
| 35.601 | 139.712 | 20 | 1.0 | 101 002 | | ... |
| 35.600 | 139.716 | 20 | 1.0 | 10 00 | PRIORITY FLIGHT RANGE | |
| 35.600 | 139.718 | 20 | 1.0 | 101 002 | | ... |
| ... | ... | ... | ... | ... | | ... |
| 35.601 | 139.720 | 20 | 2.0 | 101 002 072 | | ... |
| 35.601 | 139.722 | 20 | 2.0 | 101 002 072 | | ... |
| ... | ... | ... | ... | ... | | ... |

LEADING FLIGHT PATH (last rows)

FIG.5D

AIRFRAME INFORMATION

| UNMANNED AERIAL VEHICLE ID | VISIBILITY LEVEL | WAITING FACILITY ID | RETURN FACILITY ID |
|---|---|---|---|
| 101 | HIGH | 1212 | 1212 |
| 102 | MIDDLE | 2323 | 2323 |
| 103 | LOW | 3434 | 5656 |
| .... | .... | .... | .... |

FIG.5E

| MESSAGE ID | TEMPLATE OF GUIDANCE MESSAGE |
|---|---|
| 101 | AT ⋯ : ⋯ : ⋯ , TSUNAMI ARRIVES AT ⋯ AREA |
| 102 | ⋯ ⋯ |

FIG.5F

| MESSAGE ID | GUIDANCE MESSAGE |
|---|---|
| 001 | TSUNAMI IS COMING. PLEASE EVACUATE. |
| 002 | EVACUATION CENTER IS XYZ ELEMENTARY SCHOOL |
| 003 | EVACUATION CENTER IS LMN MIDDLE SCHOOL |
| 004 | EVACUATION CENTER IS HIZ ELEMENTARY SCHOOL |
| ⋯ | ⋯ |
| 071 | PLEASE EVACUATE TO HIGHER LOCATION THAN HERE |
| 072 | PLEASE EVACUATE TOWARD THIS PLACE |
| ⋯ | ⋯ |
| 091 | PLEASE EVACUATE TOWARD ZZZ HILL REGION |
| 092 | PLEASE EVACUATE TOWARD YYY HILL REGION |
| ⋯ | ⋯ |

FIG.6A

FLIGHT PLAN

| | FLIGHT PATH | | | SPEED | GUIDANCE MESSAGE ID |
|---|---|---|---|---|---|
| | LATITUDE | LONGITUDE | ALTITUDE | | |
| INITIAL POSITION (WAITING FACILITY) | 35.600 | 139.700 | 10 | 5.0 | |
| FORWARD PATH | 35.601 | 139.701 | 20+α | 2.0 | 101、002 071 |
| | 35.602 | 139.702 | 20+α | 2.0 | 101、002 071 |
| | 35.603 | 139.704 | 20+α | 1.0 | 101、002 071 |
| | 35.604 | 139.706 | 20+α | 1.0 | 101、002 071 |
| | 35.605 | 139.708 | 20+α | 1.0 | 101、002 071 |
| | ... | ... | ... | ... | ... |
| REVERSE PATH | 35.610 | 139.716 | 20+α | 2.0 | 101、002 071 |
| | 35.608 | 139.714 | 20+α | 2.0 | 101、002 071 |
| | ... | ... | ... | ... | ... |
| FORWARD PATH | 35.601 | 139.701 | 20+α | 2.0 | 101、002 071 |
| | 35.602 | 139.702 | 20+α | 2.0 | 101、002 071 |
| | ... | ... | ... | ... | ... |
| | ... | ... | ... | ... | ... |
| END POSITION (WAITING FACILITY) | 35.600 | 139.700 | 10 | 5.0 | |

FIG.6B

FLIGHT PLAN

| | FLIGHT PATH | | | SPEED | GUIDANCE MESSAGE ID |
|---|---|---|---|---|---|
| | LATITUDE | LONGITUDE | ALTITUDE | | |
| INITIAL POSITION (WAITING FACILITY) { | 35.600 | 139.700 | 10 | 5.0 | |
| FLIGHT PATH WITHIN EXPECTED DAMAGE AREA { | 35.601 | 139.700 | 20+α | 2.0 | 001、101 002 |
| | 35.601 | 139.704 | 20+α | 2.0 | 001、101 002 |
| | 35.601 | 139.708 | 20+α | 2.0 | 001、101 002 |
| | 35.601 | 139.712 | 20+α | 1.0 | 001、101 002 |
| | 35.600 | 139.716 | 20+α | 1.0 | 001、101 002 |
| | ... | ... | ... | ... | ... |
| LEADING FLIGHT PATH { | 35.600 | 139.716 | 20+α | 2.0 | 001、101 002、072 |
| | 35.605 | 139.716 | 20+α | 1.0 | 001、101 002、072 |
| | ... | ... | ... | ... | ... |
| FLIGHT PATH ALONG SAFETY BOUNDARY { | 35.607 | 139.720 | 20+α | 2.0 | 101、002 071 |
| | 35.607 | 139.740 | 20+α | 1.0 | 101、002 071 |
| | ... | ... | ... | ... | ... |
| | ... | ... | ... | ... | ... |
| END POSITION (WAITING FACILITY) { | 35.600 | 139.700 | 10 | 5.0 | |

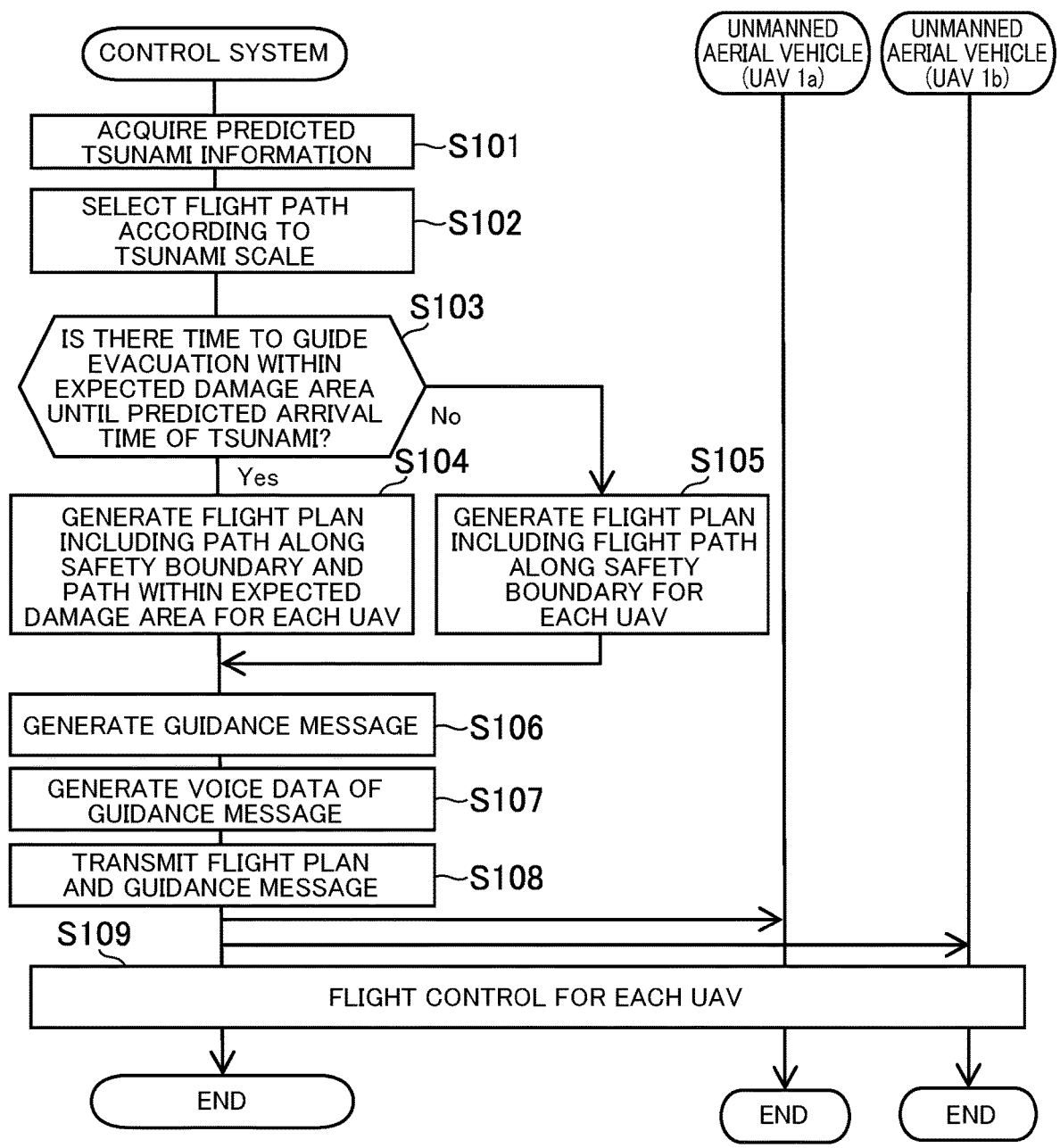

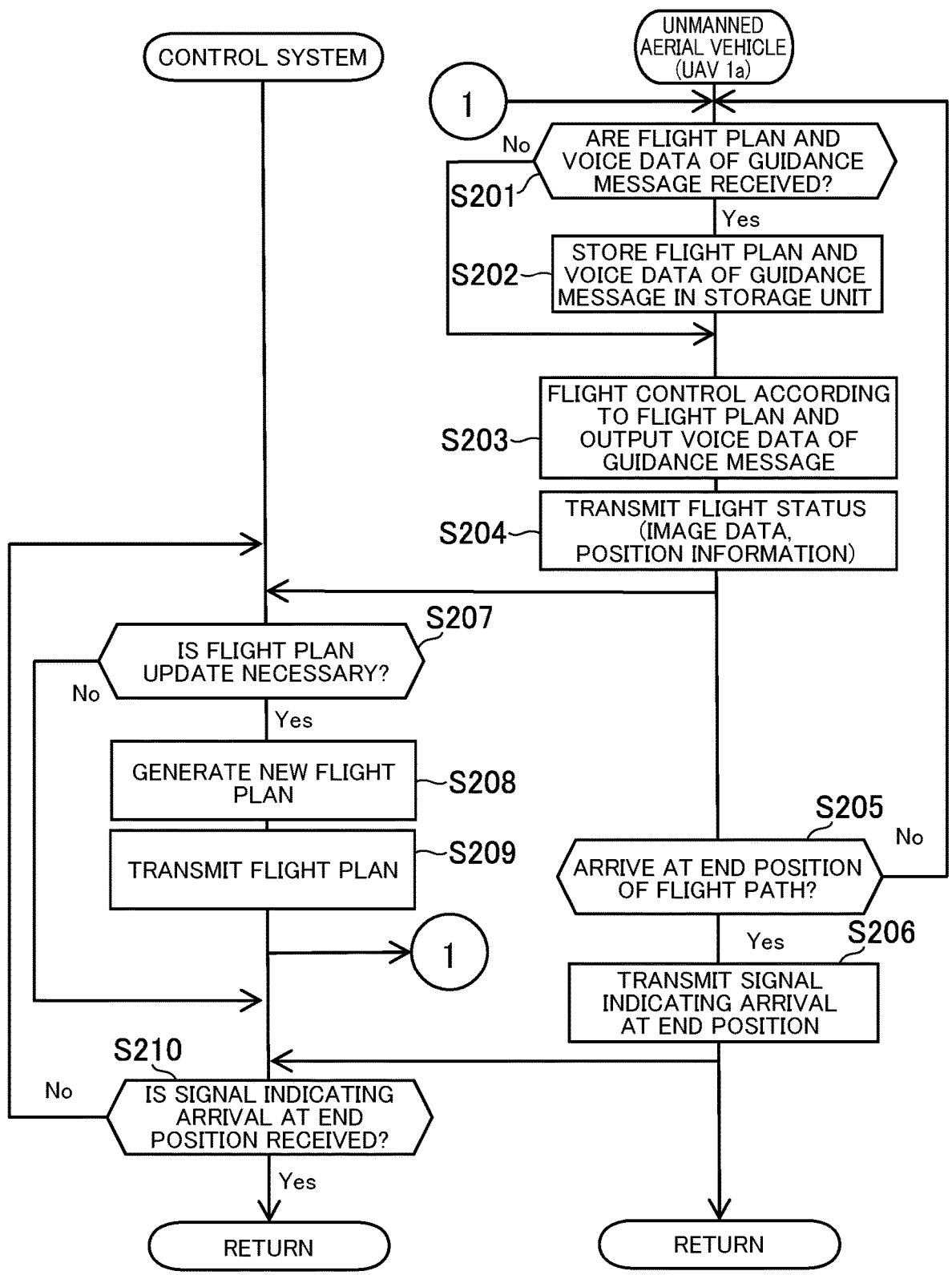

CONTROL SYSTEM, CONTROL METHOD, AND INFORMATION STORAGE MEDIUM FOR UNMANNED AERIAL VEHICLE

CROSS-REFERENCE TO RELATED APPLICATION

The present application claims priority from Japanese application JP 2021-083095 filed on May 17, 2021, the content of which is hereby incorporated by reference into this application.

BACKGROUND OF THE INVENTION

1. Field of the Invention

The present disclosure relates to a control system, a control method, and an information storage medium for an unmanned aerial vehicle (UAV).

2. Description of the Related Art

JP 2017-56899 A discloses a system for facilitating evacuation of people by an unmanned aerial vehicle in the event of a disaster such as a tsunami, a landslide, and the like. The unmanned aerial vehicle flies over the area where the disaster is predicted and announces a message from a speaker notifying the disaster.

When a tsunami occurs, it is important for the evacuees to know up to which position (height) the evacuees need to evacuate. However, in the system of JP 2017-56899 A, there is a problem that it is difficult for the evacuees to find the information of the position (height).

SUMMARY OF THE INVENTION (1) A control system for an unmanned aerial vehicle proposed in the present disclosure is a control system which controls the unmanned aerial vehicle including an informing unit that guides evacuation from a tsunami by emitting at least one of voice and light. The control system includes at least one processor. The at least one processor acquires predicted tsunami information; generates a flight plan for the unmanned aerial vehicle, the flight plan including a flight path along a boundary between an expected damage area and a safe area, the expected damage area being expected to be damaged by the tsunami indicated by the predicted tsunami information, the safe area being expected to be safe from damage caused by the tsunami; and transmits the flight plan to the unmanned aerial vehicle.

(2) The flight path may include an forward flight path in which the unmanned aerial vehicle flies along the boundary in a first direction, and an reverse flight path in which the unmanned aerial vehicle flies along the boundary in a second direction opposite to the first direction.

(3) The forward flight path and the reverse flight path may pass through a same position along the boundary.

(4) The forward flight path and the reverse flight path may pass through different positions.

(5) The flight plan may include hovering at a position along the boundary.

(6) The flight path may include a first position and a second position having priorities in flight different from each other, and the at least one processor may generate the flight plan such that a flight speed at the first position and a flight speed at the second position are different from each other.

(7) The flight path may include a first partial path defined within the expected damage area and a second partial path including the flight path along the boundary.

(8) A guidance announced in the first partial path and a guidance announced in the second partial path may be different from each other. Accordingly, it is possible to inform a guidance suitable for each partial path.

(9) The at least one processor may generate the flight plan based on a predicted arrival time of tsunami indicated by the predicted tsunami information.

(10) The at least one processor may update the flight plan based on an image acquired by an image capturing unit mounted on the unmanned aerial vehicle.

(11) The control system may further include a storage device that stores a plurality of candidate paths corresponding to a plurality of tsunami scales, respectively. The at least one processor may generate a flight plan for the unmanned aerial vehicle based on the candidate path corresponding to a scale of the tsunami indicated by the predicted tsunami information.

(12) The control system is a system that controls a first unmanned aerial vehicle and a second unmanned aerial vehicle, each of which includes the informing unit. The at least one processor may generate a first flight plan to be transmitted to the first unmanned aerial vehicle based on the predicted tsunami information, and generate a second flight plan to be transmitted to the second unmanned aerial vehicle based on the predicted tsunami information.

(13) The control system may include at least one storage device that stores information indicating visibility of a plurality of unmanned aerial vehicles, the visibility being for evacuees. The flight plan may include information on altitude where each unmanned aerial vehicle flies. The at least one processor may generate the information on altitude based on the information on airframes.

(14) A control method for an unmanned aerial vehicle proposed in the present disclosure is a control method for an unmanned aerial vehicle including an informing unit that guides evacuation from a tsunami by emitting at least one of voice and light. The control method includes acquiring predicted tsunami information; generating a flight plan for the unmanned aerial vehicle, the flight plan including a flight path along a boundary between an expected damage area and a safe area, the expected damage area being expected to be damaged by the tsunami indicated by the predicted tsunami information, the safe area being expected to be safe from damage caused by the tsunami; and transmitting the flight plan to the unmanned aerial vehicle.

(15) An information storage medium proposed in the present disclosure is a non-transitory information storage medium storing a program for causing a computer to function as a device which controls an unmanned aerial vehicle including an informing unit that guides evacuation from a tsunami by emitting at least one of voice and light. The program causes the computer to acquire predicted tsunami information; generate a flight plan for the unmanned aerial vehicle, the flight plan including a flight path along a boundary between an expected damage area and a safe area, the expected damage area being expected to be damaged by the tsunami indicated by the predicted tsunami information, the safe area being expected to be safe from damage caused by the tsunami; and transmit the flight plan to the unmanned aerial vehicle.

According to the control system, control method, and information storage medium proposed in the present disclosure, it is possible to guide the evacuees as to up to which position (height) the evacuees need to evacuate.

BRIEF DESCRIPTION OF THE DRAWINGS

FIG. 3A is a schematic diagram illustrating an example of operations of the unmanned aerial vehicles;

FIG. 5A is a diagram illustrating an example of flight path basic information that is the basis of a flight plan including a flight path along a safety boundary;

FIG. 5B is a diagram illustrating an example of tsunami scale-to-flight path information;

FIG. 5C is a diagram illustrating an example of flight path basic information that is the basis of a flight plan including a flight path within an expected damage area;

FIG. 5D is a diagram illustrating an example of airframe information;

FIG. 5E is a diagram illustrating an example of template information;

FIG. 5F is a diagram illustrating an example of guidance message information;

FIG. 6A is a diagram illustrating an example of a flight plan generated by a flight plan generation unit;

FIG. 6B is a diagram illustrating another example of a flight plan generated by the flight plan generation unit;

FIG. 7A is a diagram illustrating an example of a process executed in the control system; and FIG. 7B is a diagram illustrating an example of a process executed in the control system.

DETAILED DESCRIPTION OF THE INVENTION

Hereinafter, an example of a control system for an unmanned aerial vehicle proposed in the present disclosure will be described. Hereinafter, the unmanned aerial vehicle will be referred to as a UAV.

A control system 10 is connected to a plurality of UAVs 1a and 1b via a network. Further, the control system 10 is connected to a tsunami prediction system 200. The network includes a mobile communication network and the Internet.

Tsunami Prediction System

Figure 1:
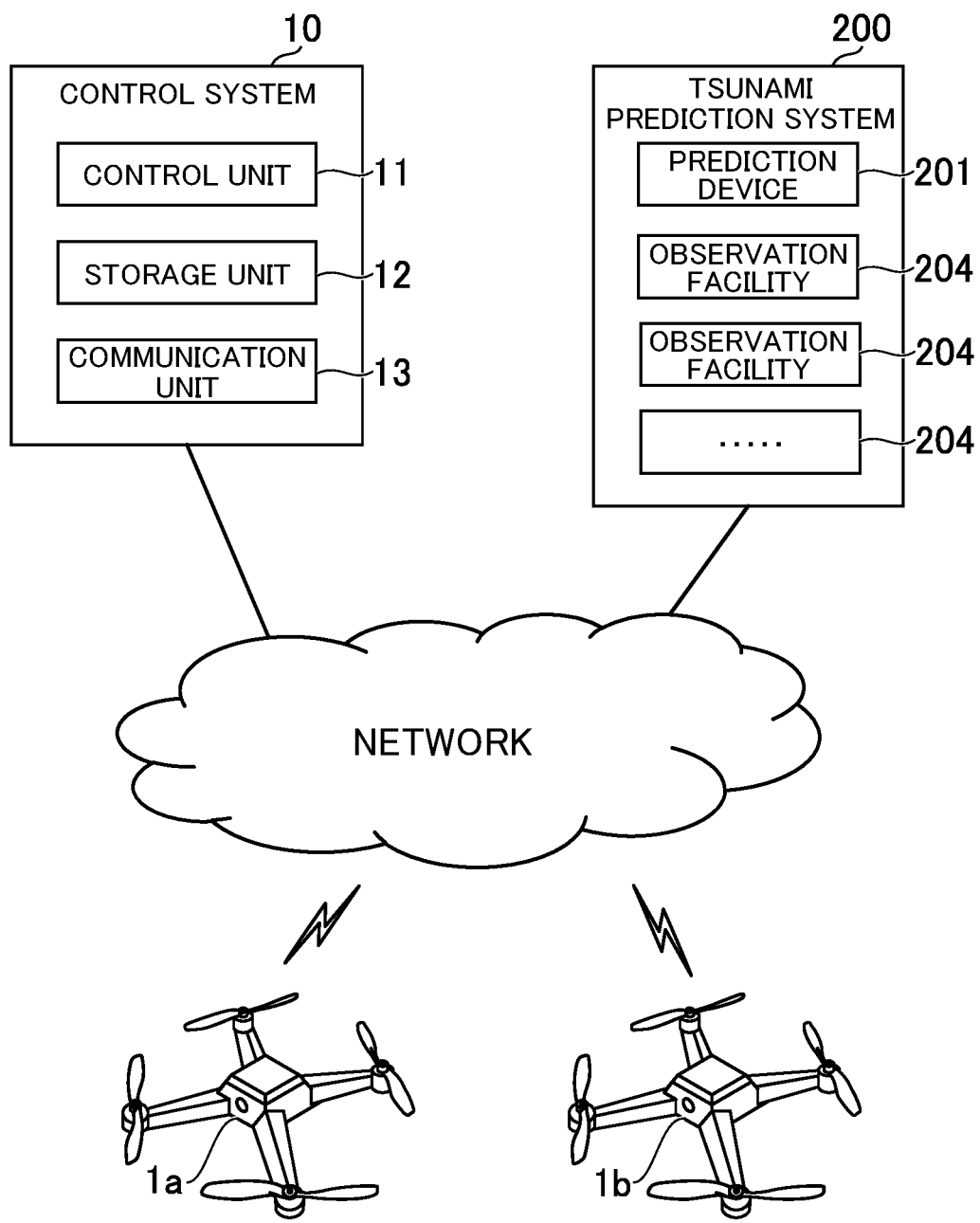
FIG. 1 is a block diagram of a system including a control system, unmanned aerial vehicles, and a tsunami prediction system proposed in the present disclosure.

As illustrated in FIG. 1, the tsunami prediction system 200 includes a prediction device 201 and an observation facility 204. The observation facility 204 includes a seismograph installed by a public institution on the ocean or island, for example. The observation facility 204 transmits information (earthquake information) representing shaking and position measured by the seismograph to the prediction device 201 via satellite communication, for example. The tsunami prediction system 200 may include a plurality of observation facilities 204. The prediction device 201 generates predicted tsunami information based on the received earthquake information. The predicted tsunami information includes a coastal area where the tsunami is expected to arrive, an expected tsunami scale, and a predicted arrival time of tsunami to the coast. The prediction device 201 transmits the predicted tsunami information to the control system 10 via the network. The prediction device 201 includes one or more server computers.

Control System

The control system 10 includes a control unit 11, a storage unit 12, and a communication unit 13. The control unit includes at least one microprocessor, for example. The control unit 11 executes a process in accordance with programs and data stored in the storage unit 12. The storage unit 12 includes a random access memory (RAM), a hard disk drive, a solid state drive (SSD), and the like, for example. The communication unit 13 includes a communication interface for wired or wireless communication. The communication unit 13 performs data communication via the network. In the present disclosure, the control system 10 receives the predicted tsunami information from the tsunami prediction system 200 through the communication unit 13, generates a flight plan for each of the plurality of the UAVs 1a and 1b based on the predicted tsunami information, and transmits the flight plan to the UAVs 1a and 1b through the communication unit 13. Although two UAVs 1a and 1b are illustrated in FIG. 1, the number of UAVs controlled by the control system 10 may be one, or more than two.

Unmanned Aerial Vehicle

Figure 2:
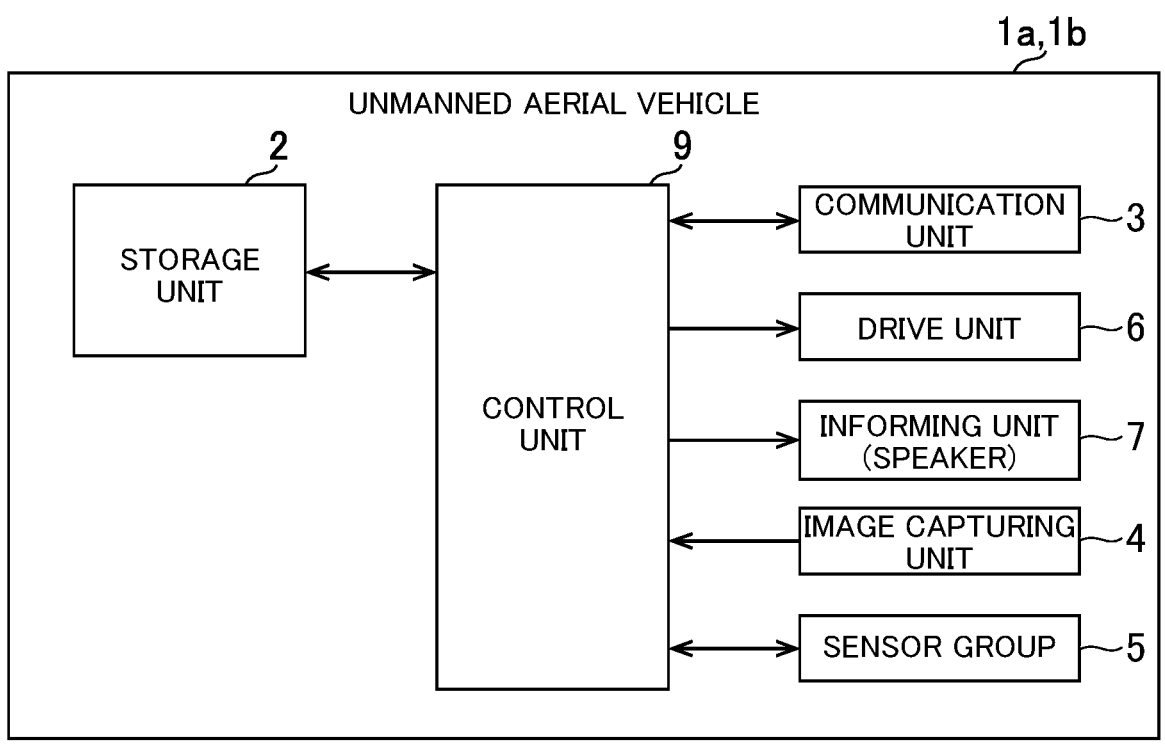
FIG. 2 is a block diagram illustrating hardware of the unmanned aerial vehicles.

FIG. 2 is a block diagram illustrating hardware included in the UAVs 1a and 1b. As illustrated in FIG. 2, each of the UAVs 1a and 1b includes a control unit 9, a storage unit 2, a communication unit 3, an image capturing unit 4, a sensor group 5, a drive unit 6, and an informing unit 7.

The sensor group 5 includes a flight position sensor and an altitude sensor. The flight position sensor is a global navigation satellite system (GNSS) sensor, for example. The altitude sensor is a barometric pressure sensor, for example, and outputs a signal corresponding to the flight altitude of a UAV 1. The sensor group 5 may further include a posture sensor including an acceleration sensor and an angular velocity sensor, and a geomagnetic sensor. Further, the flight position sensor may include a light detection and ranging (LiDAR) sensor. In this case, the flight path described below is not specified as a position (latitude, longitude) calculable based on the output of the GNSS sensor, but may be specified by the coordinates in a predetermined coordinate system in the area where the UAVs 1a and 1b fly.

The drive unit 6 includes an electric motor and a rotor (blade) that is rotated by driving the electric motor. Further, the drive unit 6 includes a drive circuit that supplies electric power to the electric motor according to a signal output from the control unit 11.

The control unit 9 includes at least one microprocessor, for example. The control unit 9 executes a process in accordance with the programs and data stored in the storage unit 2. The flight plan received from the control system 10 includes a path (flight path) for the UAVs 1a and 1b to fly along. The control unit 9 detects a current position of the corresponding aircraft based on the output of the sensor group 5, and outputs a control signal to the drive unit 6 such that the UAVs 1a and 1b fly along the flight path. The storage unit 2 includes a RAM, a ROM, a hard disk drive, an SSD, and the like, for example. The communication unit 3 includes a communication interface for wired or wireless communication. The communication unit 3 performs data communication with the control system 10 via the network.

The image capturing unit 4 includes one or more cameras and captures an image below the UAV 1. The image data acquired by the image capturing unit 4 during the flight of the UAV 1 is transmitted to the control system 10 through the communication unit 3. The image capturing unit 4 may be a 360-degree camera, or a plurality of cameras with less than 360 degrees of angle of view.

The informing unit 7 guides evacuation from the tsunami by at least one of voice and light. In this specification, "guiding evacuation" refers to indicating either in voice or light a place to evacuate, a predicted arrival time of tsunami, and the like. The informing unit 7 preferably includes a speaker that informs by voice the information such as a place to evacuate, a predicted arrival time of tsunami, and the like. Further, the informing unit 7 may include a light emitting unit including an LED. The UAVs 1a and 1b can guide people to a place to evacuate by emitting light from the light emitting unit while flying near the place to evacuate (specifically, a safety boundary to be described below).

Movement of Unmanned Aerial Vehicle

FIGS. 3A to 3E are schematic views illustrating an example of operations of the UAVs 1a and 1b controlled by the control system 10. These drawings schematically illustrate examples in a coastal area. In the examples illustrated in these drawings, there are residential areas and commercial areas in the coastal area. In addition, there is a hill region in the inland area away from the coast. Waiting facilities Sa and Sb for the UAVs 1a and 1b are installed in the coastal area. The waiting facilities Sa and Sb may be installed near or in the residential area, or installed on a hill region.

In FIG. 3A, six broken lines L1a to L3a and L1b to L3b are illustrated. The broken lines L1a to L3a and L1b to L3b indicate boundaries between areas (expected damage areas) expected to be damaged when the tsunami arrives in the coastal area and areas (safe areas) expected to be safe from damage. The inland side (hill region side) of the broken lines L1a to L3a and L1b to L3b is the safe areas (hereinafter, this boundary is referred to as a "safety boundary"). The broken lines L1a and L1b are safety boundaries when a relatively small scale tsunami arrives in the coastal area, for example, the broken lines L2a and L2b are safety boundaries when a medium scale tsunami arrives in the coastal area, for example, and the broken lines L3a and L3b are safety boundaries when a large scale tsunami arrives in the coastal area, for example. The safety boundaries L2a and L2b are defined closer to the hill region than the safety boundaries L1a and L1b, respectively, and the safety boundaries L3a and L3b are defined closer to the hill region than the safety boundaries L2a and L2b, respectively. The tsunami scales associated with the safety boundaries may be in two stages rather than three stages, or in more than three stages.

Upon receiving the predicted tsunami information from the tsunami prediction system 200, the control system 10 generates a flight plan for each of the UAVs 1a and 1b. The flight plan includes information that defines the operation of each of the UAVs 1a and 1b during flight, such as flight path, flight speed, and the like. The flight plan generated by the control system 10 includes a flight path along the safety boundaries L1a to L3a and L1b to L3b corresponding to the predicted tsunami scale.

In the example illustrated in FIG. 3A, the flight plan including a flight path R1a along the safety boundary L1a is generated for a first UAV 1a, and a flight plan including a flight path R1b along the safety boundary L1b is generated for a second UAV 1b. The flight paths R1a and R1b are defined along the slope of the hill region, for example. Upon receiving the flight plan from the control system 10, the UAVs 1a and 1b fly according to the flight plan. According to this flight, it is possible to guide the evacuees as to up to which position (height) the evacuees need to evacuate. In addition, it is possible to guide the evacuees in the direction to evacuate (evacuation mark). The first UAV 1a flies from the waiting facility Sa toward the safety boundary L1a, and then flies along the flight path R1a, for example. The second UAV 1b flies from the waiting facility Sb toward the safety boundary L1b, and then flies along the flight path R1b, for example. The UAVs 1a and 1b preferably guide the evacuees to evacuate from the tsunami while flying according to the flight plan. Specifically, the UAVs 1a and 1b preferably inform the evacuees of the predicted arrival time of tsunami and the name of evacuation center by voice.

The safety boundaries L1a to L3a and L1b to L3b may be specified based on information published by a public institution (a national administrative agency, a local public institution, and the like), for example. Examples of such information include a hazard map. In the hazard map, the areas that may be damaged by the tsunami are estimated according to the scale of the tsunami. In the process of constructing the control system 10, a builder of the control system 10 may generate the basic information (for example, the flight path basic information (FIG. 5A), and the tsunami scale-to-flight path information (FIG. 5B) to be described below) stored in the storage unit 12 with reference to the safety boundary.

Figure 3B:
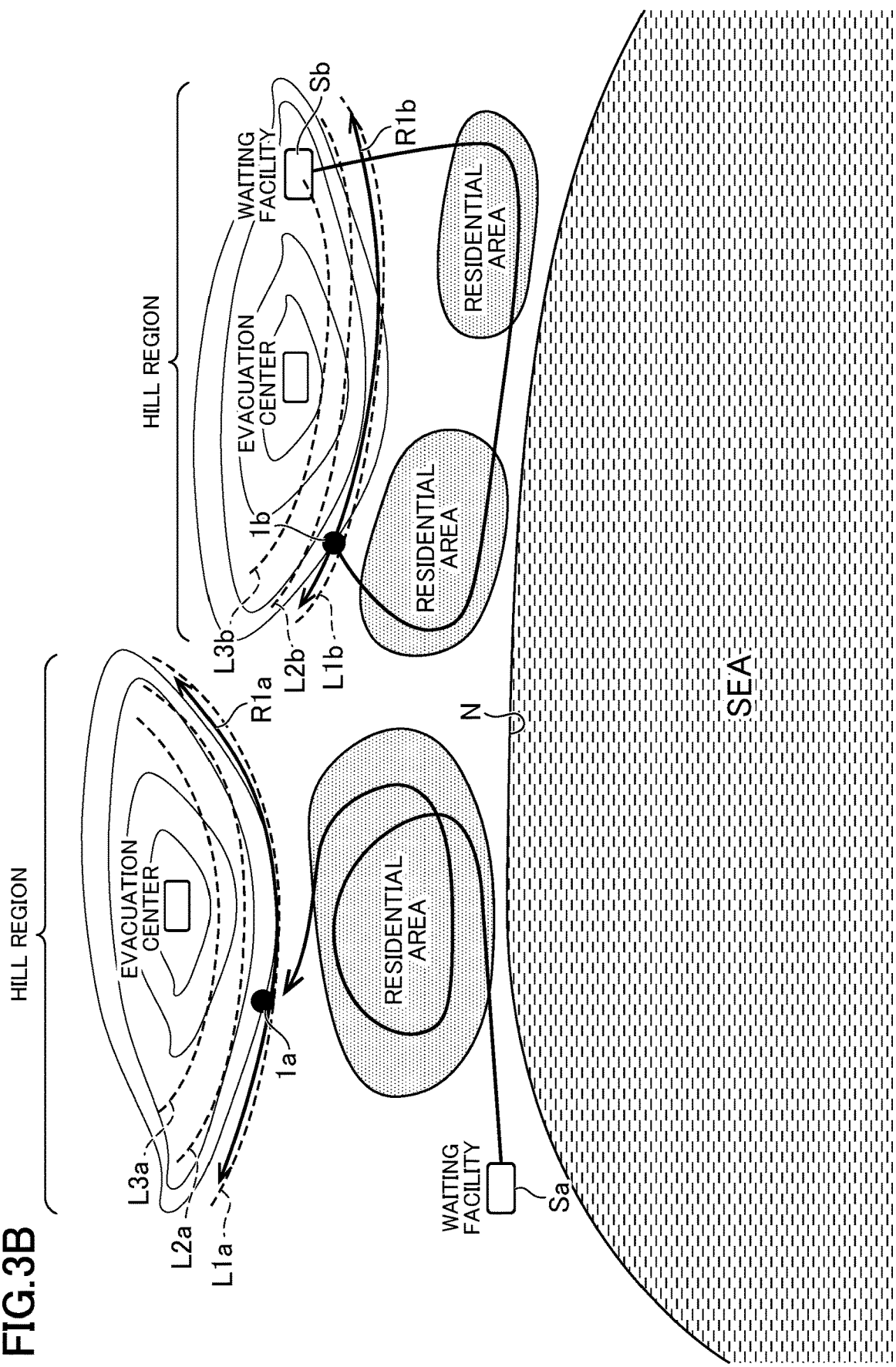
FIG. 3B is a schematic diagram illustrating an example of operations of the unmanned aerial vehicles.

FIG. 3B is a diagram illustrating another example of the flight path of the UAVs 1a and 1b. As illustrated in the drawing, the UAVs 1a and 1b may fly in the expected damage area before flying along the safety boundaries L1a to L3a and L1b to L3b. In the example illustrated in FIG. 3B, the first UAV 1a flies a residential area within the expected damage area, and the second UAV 1b flies two commercial areas within the expected damage area. The UAVs 1a and 1b may circle in a predetermined area within the expected damage area one or more times. While flying in the expected damage area, each of the UAVs 1a and 1b may guide the evacuees to evacuate. For example, while flying in the expected damage area, each of the UAVs 1a and 1b may inform the evacuees of the predicted arrival time of tsunami and the evacuation center by voice.

In addition, the UAVs 1a and 1b may lead the evacuees to the safety boundary in the process of flying from the area defined within the expected damage area (residential area and commercial area in the example of FIG. 3B) toward the safety boundaries L1a to L3a and L1b to L3b. For example, the UAVs 1a and 1b may fly along an evacuation path (a road suitable for evacuation) that the evacuees need to take. In the example illustrated in FIG. 3B, the first UAV 1a is flying along the evacuation path (a road suitable for evacuation) in the process of flying from the residential area toward the safety boundary L1a (hereinafter, this flight is referred to as a "leading flight"). The flight speed in the leading flight may be set to be different from the flight speed in the residential area or the flight speed along the safety boundary. The flight speed in the leading flight may be set according to the walking speed of humans.

Figure 3C:
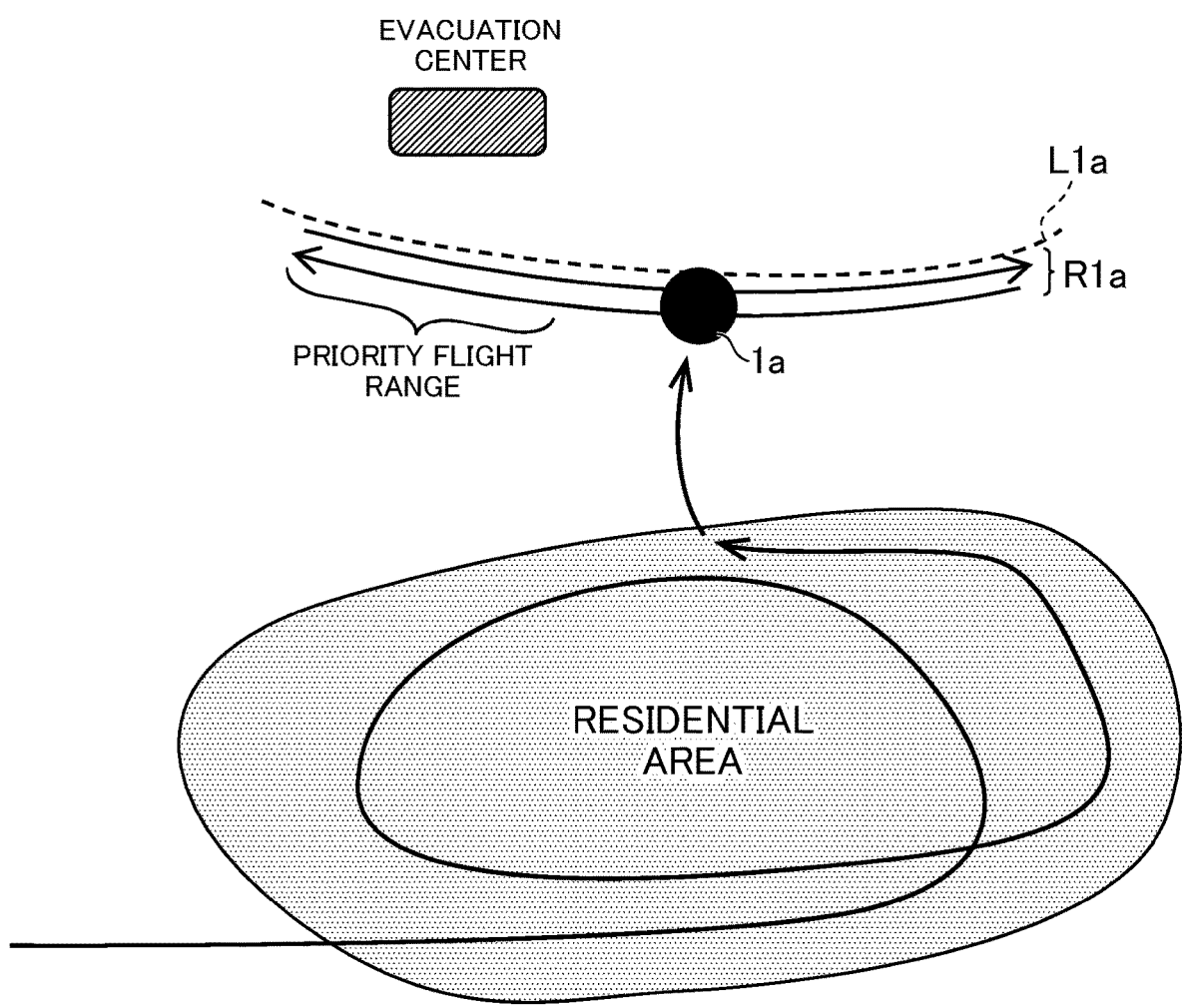
FIG. 3C is a schematic diagram illustrating an example of an operation of the unmanned aerial vehicle.

The first UAV 1a may make a round trip on a path along the safety boundaries L1a, L2a, and L3a. That is, as illustrated in FIG. 3C, the flight path R1a included in the flight plan of the first UAV 1a may include an forward flight path along the safety boundary L1a and an reverse flight path along the safety boundary L1a. The first UAV 1a may execute each of the forward flight and the reverse flight along the safety boundary L1a a plurality of times. According to this flight, the evacuees can properly confirm the direction to evacuate and the location to reach at the time of evacuation. Like the first UAV 1a, the second UAV 1b may execute each of the forward flight and the reverse flight along the safety boundaries L1b, L2b, and L3b a plurality of times.

Thus, when the flight plan includes the forward flight path and the reverse flight path, the forward flight path and the reverse flight path may pass through the same position as illustrated in FIG. 3C (in FIG. 3C, the forward flight path and the reverse flight path are represented by two parallel lines).

Unlike the example of FIG. 3C, the forward flight path and the reverse flight path may be defined to alternately enter the inside of the safety boundary (sea side) and the outside of the safety boundary (inland side). That is, the forward flight path and the reverse flight path may be defined in a wavy pattern.

Figure 3D:
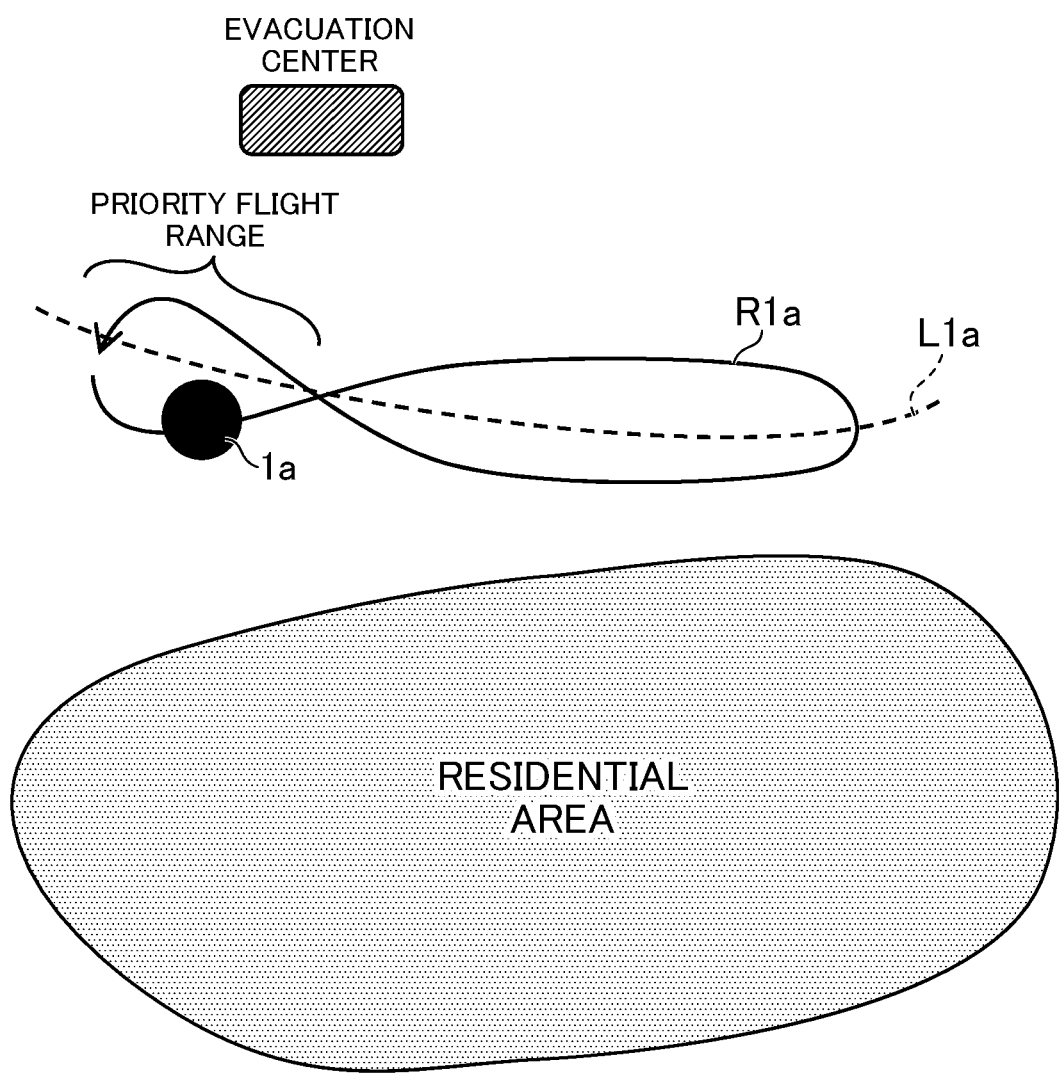
FIG. 3D is a schematic diagram illustrating an example of an operation of the unmanned aerial vehicle.

Further, as illustrated in FIG. 3D, when the flight path R1a included in the flight plan includes the forward flight path (rightward path in FIG. 3D) and the reverse flight path (leftward path in FIG. 3D), the forward flight path and the reverse flight path may pass through different positions. In this case, the forward flight path and the reverse flight path may be defined to intersect the safety boundary L1a.

Further, the UAVs 1a and 1b may preferentially fly a part of the flight path along the safety boundary according to the tsunami scale. In the example illustrated in FIGS. 3C and 3D, the first UAV 1a preferentially flies at positions close to the evacuation center in the flight path R1a along the safety boundary L1a. Specifically, the first UAV 1a may fly at some positions of the flight path at a lower speed than other positions, for example (in FIGS. 3C and 3D, the positions of preferential flight are illustrated as a "PRIORITY FLIGHT RANGE"). According to this flight, it is possible to more effectively guide the evacuees in the direction to evacuate.

Figure 3E:
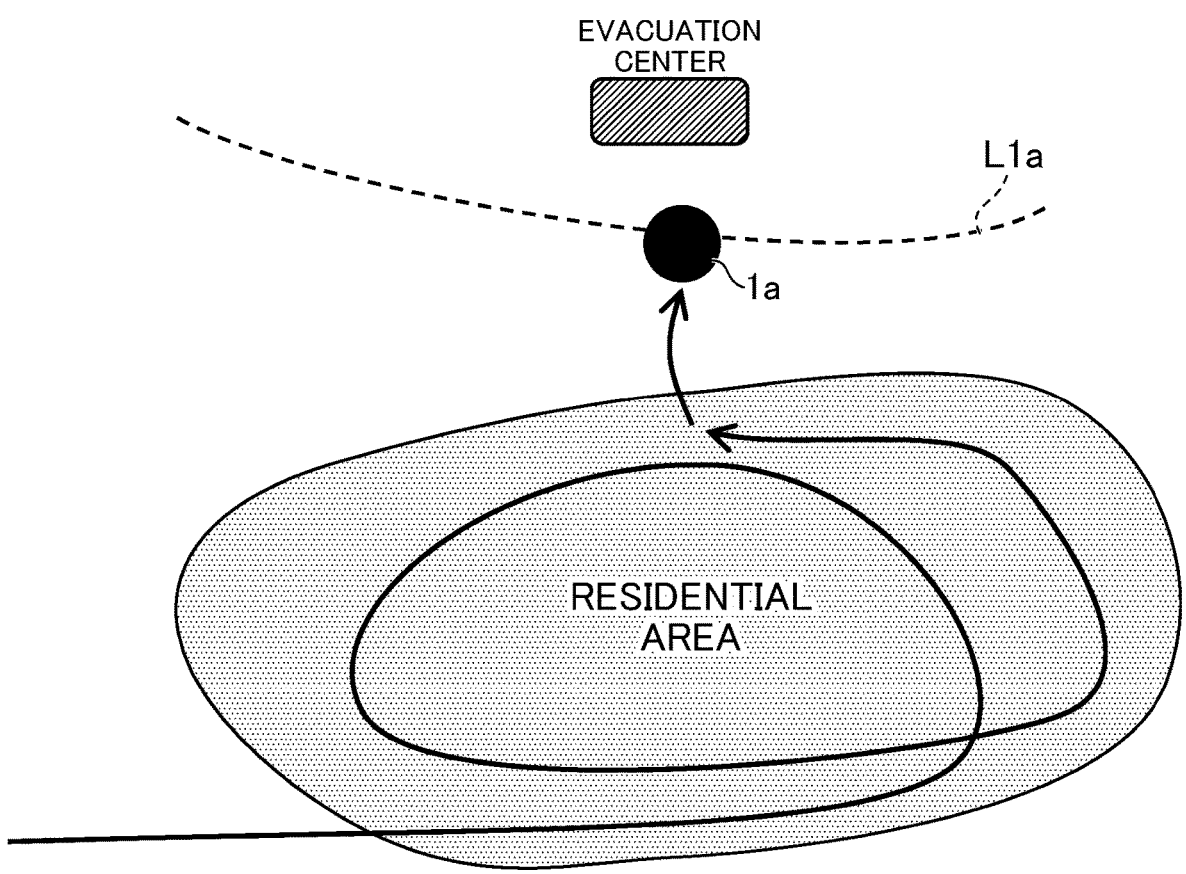
FIG. 3E is a schematic diagram illustrating an example of an operation of the unmanned aerial vehicle.

In addition, the flight plan generated by the control system 10 may include hovering at a position along the safety boundary. For example, the first UAV 1a may stay over the safety boundary L1a, as illustrated in FIG. 3E. At this time, the position of the first UAV 1a may be near the evacuation center.

In this specification, an example of the "flight path along the safety boundary" is a flight path defined in parallel with the safety boundary, as illustrated in FIG. 3C. However, the "flight path along the safety boundary" is not limited thereto, and may be defined to intersect the safety boundary, as illustrated in FIG. 3D. In this case, a part of the flight path may be defined to be on the inland side from the safety boundary and the other part may be defined to be on the sea side from the safety boundary. Further, the distance between the flight path and the safety boundary is not particularly limited as long as the evacuees can recognize that the vicinity of the UAVs 1a and 1b is safe. For example, the distance between the flight path and the safety boundary may be several tens of meters or several hundred meters.

Functions of Control System

Hereinafter, an example of the process executed by the control system 10 in order to realize the flight of the UAVs 1a and 1b described with reference to FIGS. 3A to 3E will be described.

Figure 4:
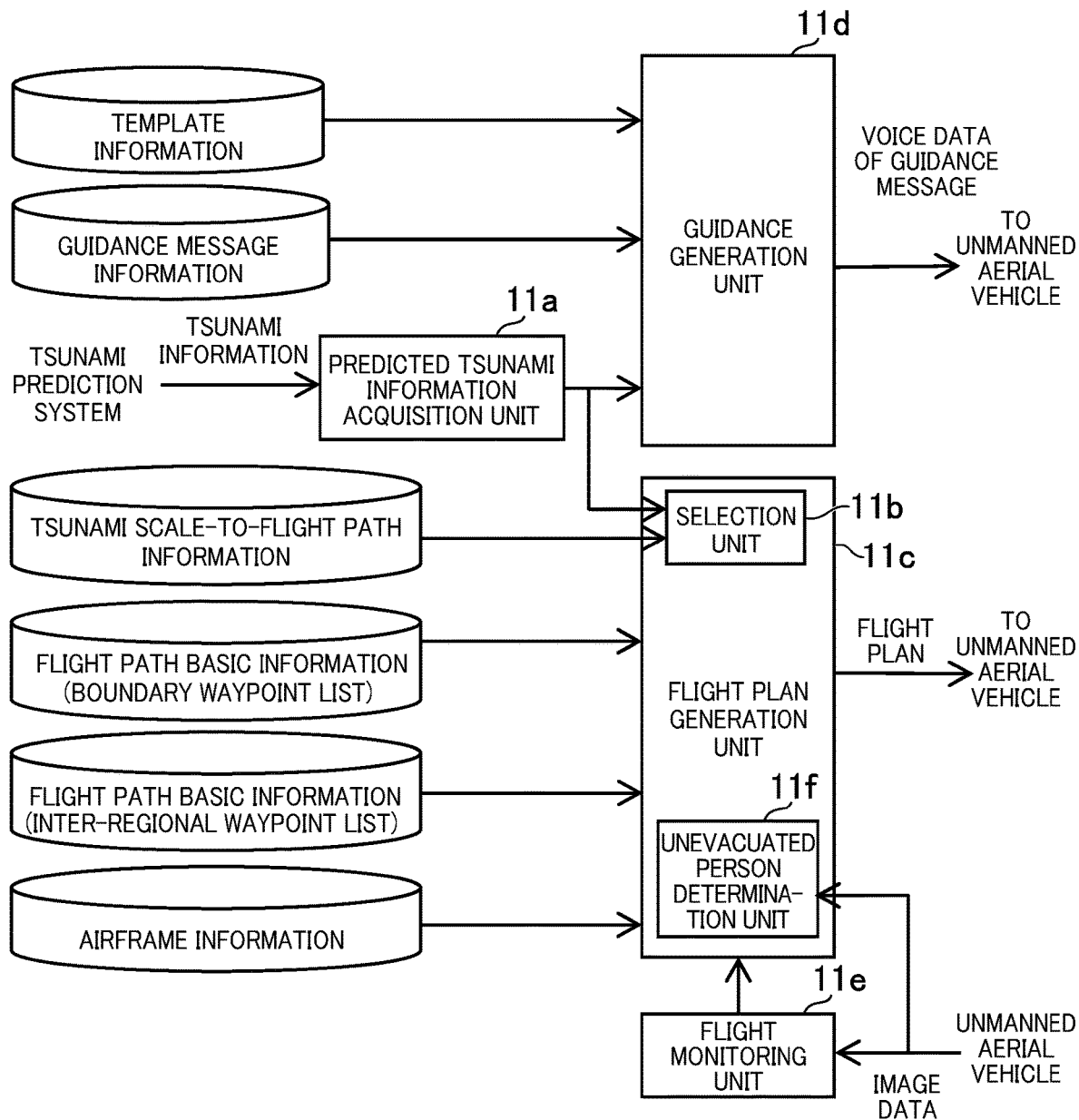
FIG. 4 is a block diagram illustrating a function of the control system.

FIG. 4 is a block diagram illustrating a function of the control system 10. The control system 10 includes a predicted tsunami information acquisition unit 11a, a flight plan generation unit 11c, a guidance generation unit 11d, and a flight monitoring unit 11e as functions of the control system 10. These are realized by the control unit 11 that executes the program stored in the storage unit 12. The storage unit 12 stores information that is referred to by the control unit 11 when executing program. Specifically, as illustrated in FIG. 4, the storage unit 12 stores tsunami scale-to-flight path information (FIG. 5B), flight path basic information (boundary waypoint list, FIG. 5A) that is the basis of a flight plan including flight paths along safety boundaries, flight path basic information (intra-regional waypoint list, FIG. 5C) that is the basis of the flight plan including a flight path within the expected damage area, airframe information (FIG. 5D), template information (FIG. 5E), and guidance message information (FIG. 5F).

Predicted Tsunami Information Acquisition Unit

The predicted tsunami information acquisition unit 11a acquires the predicted tsunami information transmitted by the tsunami prediction system 200. The predicted tsunami information includes a predicted tsunami scale, a predicted arrival area, and a predicted arrival time, as described above. The predicted tsunami scale represents the tsunami scale in a plurality of stages such as 3 stages, 5 stages, and the like, for example. Alternatively, the predicted tsunami scale may be a numerical value (2 meters, 2.5 meters, and the like) that represents the height of the tsunami. A plurality of forecast zones are defined along the coast of the country. For example, the coast of ABC prefecture, the coast of DEF peninsula, the coast of the northern part of GHI region, and the like are defined. The predicted tsunami scale included in the predicted tsunami information is calculated for each forecast zone according to the scale of the earthquake that occurs. The predicted arrival area is the name of the forecast zone and the identification information of the forecast zone.

Flight Plan Generation Unit

The flight plan generation unit 11c generates a flight plan for each of the UAVs 1a and 1b. The flight plan generation unit 11c generates a flight plan with reference to the flight path basic information stored in the storage unit 12 and the "tsunami scale-to-flight path information", for example.

FIG. 5A is a diagram illustrating an example of the flight path basic information for realizing flight along the safety boundary. The flight path basic information includes a plurality of lists respectively representing a plurality of candidate paths for each of the UAVs 1a and 1b to fly along, for example. In these lists, as illustrated in FIG. 5A, the positions (latitude, longitude, and altitude) that the UAVs 1a and 1b need to pass through are arranged in order. In each list, the flight speed may be defined according to the position that the UAVs 1a and 1b need to pass through. Hereinafter, each position (latitude, longitude, and altitude) in the list is referred to as a waypoint. In addition, each of the lists is referred to as a "boundary waypoint list".

As described with reference to FIG. 3A, there are flight paths along a plurality of safety boundaries L1a, L2a, and L3a as the candidate paths for the first UAV 1a, and there are flight paths along a plurality of safety boundaries L1b, L2b, and L3b as the candidate paths for the second UAV 1b. The flight path basic information includes a plurality of boundary waypoint lists illustrating the flight paths along the plurality of safety boundaries L1a to L3a and L1b to L3b, respectively.

FIG. 5B is a diagram illustrating an example of "tsunami scale-to-flight path information". As illustrated in the drawing, in the "tsunami scale-to-flight path information", the tsunami scale (for example, small scale, medium scale, and large scale) is associated with the flight paths R1a to R3a and R1b to R3b. For example, the flight paths R1a and R1b are associated with the small scale tsunamis, and the flight paths R2a and R2b are associated with the medium scale tsunamis.

The flight plan generation unit 11c includes a selection unit 11b (see FIG. 4). The selection unit 11b selects the flight path for the UAVs 1a and 1b based on the predicted tsunami scale. That is, the selection unit 11b selects a path (boundary waypoint list) corresponding to the predicted tsunami scale from a plurality of candidate paths (a plurality of boundary waypoint lists) included in the flight path basic information. For example, when the expected tsunami scale is small, the selection unit 11b selects a boundary waypoint list representing the flight path R1a along the safety boundary L1a for the first UAV 1a, and selects a boundary waypoint list representing the flight path R1b along the safety boundary L1b for the second UAV 1b.

The flight plan generation unit 11c generates the flight plan for each of the UAVs 1a and 1b based on the selected path (selected boundary waypoint list). The flight plan generation unit 11c generates the flight plan including an forward flight path along the safety boundary (forward flight path) and an reverse flight path along the safety boundary (reverse flight path).

As illustrated in FIG. 5A, the boundary waypoint list includes waypoints indicating the forward flight path and waypoints indicating the reverse flight path, for example. The waypoints indicating the forward flight path and the waypoints indicating the reverse flight path are arranged in the opposite order. By using the boundary waypoint list, the flight plan generated by the flight plan generation unit 11c includes the forward path and the reverse path.

FIG. 6A is a diagram illustrating an example of the flight plan generated by the flight plan generation unit 11c. For example, the flight plan generation unit 11c connects a plurality of the same boundary waypoint lists in succession to generate a flight plan. More specifically, the boundary waypoint list is connected as many times as the UAVs 1a and 1b make a round trip on the flight path, and one flight plan is generated for each of the UAVs 1a and 1b. By this process of the flight plan generation unit 11c, the flight plan including the forward flight path and the reverse flight path described with reference to FIG. 3A is generated.

The flight plan generation unit 11c may generate a flight plan based on the predicted arrival time of tsunami. For example, the flight plan generation unit 11c may calculate the number of times each of the UAVs 1a and 1b make a round trip on the flight path, that is, the number of times the boundary waypoint list is connected in succession, based on the predicted arrival time of tsunami. More specifically, the number of boundary waypoint lists connected in succession may be calculated based on a value obtained by dividing the time from the scheduled arrival time to the flight path of each of the UAVs 1a and 1b to the predicted arrival time of tsunami, by the time required for each of the UAVs 1a and 1b to make a round trip on the flight path.

The flight path of the first UAV 1a and the flight path of the second UAV 1b are defined along a common coast N (see FIG. 3A). The flight path of the first UAV 1a and the flight path of the second UAV 1b are defined so as not to overlap with each other. That is, the waypoints in the plurality of boundary waypoint lists for the first UAV 1a (FIG. 5A) and the waypoints in the plurality of boundary waypoint lists for the second UAV 1b do not overlap with each other.

The forward flight path and the reverse flight path may pass through the same position. That is, in each boundary waypoint list illustrated in FIG. 5A, the plurality of waypoints indicating the forward path and the plurality of waypoints indicating the reverse path may be the same as each other. In this case, as described with reference to FIG. 3C, each of the forward flight path and the reverse flight path may be parallel to the safety boundaries L1a to L3a and L1b to L3b.

Alternatively, the forward flight path and the reverse flight path may pass through different positions. That is, in each boundary waypoint list illustrated in FIG. 5A, the plurality of waypoints indicating the forward path and the plurality of waypoints indicating the reverse path may be different from each other. In this case, as described with reference to FIG. 3D, the forward and reverse flight paths may be defined so as to intersect the safety boundaries L1a to L3a and L1b to L3b.

As illustrated in FIG. 6A, in one example of the flight plan, latitude, longitude, altitude, and velocity are defined for each waypoint. Further, in the flight plan illustrated in FIG. 6A, a guidance message ID, which will be described below, is associated with each waypoint. The elements defined in the flight plan are not limited to those illustrated above. For example, the orientation of an airframe may be defined at each waypoint.

As illustrated in FIG. 5A, in the boundary waypoint list, some waypoints are set to have lower flight speeds than other waypoints (in FIG. 5A, a plurality of waypoints with low flight speeds are illustrated as the PRIORITY FLIGHT RANGE). When such a boundary waypoint list is used, even in the flight plan generated by the flight plan generation unit 11c, the flight speeds at some waypoints are lower than the flight speeds at other waypoints. As a result, as described with reference to FIGS. 3C and 3D, the flight speeds of the UAVs 1a and 1b at the higher priority position are lower than the flight speeds at other positions. Then, it is possible to effectively guide the evacuees to the evacuation center.

As described with reference to FIG. 3E, the flight plan may include hovering at a position along the safety boundary. In this case, the flight path basic information for realizing flight along the safety boundary may be a plurality of positions (waypoints) associated with each tsunami scale. For example, the flight path basic information may have three waypoints associated with each of small scale, medium scale, and large scale for each of the plurality of the UAVs 1a and 1b. The selection unit 11b may select a waypoint where the UAVs 1a and 1b need to fly (hover) based on the predicted tsunami information (more specifically, the predicted tsunami scale).

The storage unit 12 may store not only the flight path basic information for realizing flight along the safety boundary (see FIG. 5A), but also the flight path basic information for realizing flight within the expected damage area. The flight plan generation unit 11c may generate a flight plan with reference to these two pieces of the flight path basic information. The flight plan may include a flight path defined within the expected damage area (first partial path) and a flight path along the safety boundary (second partial path). That is, the UAVs 1a and 1b may fly in the area defined within the expected damage area (residential area and commercial area in FIG. 3B), and then fly along the flight path selected by the selection unit 11b, as illustrated in FIG. 3B.

FIG. 5C is a diagram illustrating an example of the flight path basic information for realizing flight within the expected damage area. The flight path basic information includes a plurality of lists illustrating the flight paths of each of the UAVs 1a and 1b, for example. Like the flight path basic information described with reference to FIG. 5A, in these lists, the positions (latitude, longitude, and altitude) that the UAVs 1a and 1b need to pass through are arranged in order. In each list, the flight speeds are defined corresponding to the passing positions (waypoints) of the UAVs 1a and 1b (hereinafter, this list will be referred to as the "intra-regional waypoint list").

The plurality of intra-regional waypoint lists may be associated with each of the plurality of the UAVs 1a and 1b controlled by the control system 10 in advance. When the predicted tsunami information acquisition unit 11a acquires the predicted tsunami information, the flight plan generation unit 11c selects the intra-regional waypoint list for each of the plurality of the UAVs 1a and 1b from a plurality of intra-regional waypoint lists included in the flight path basic information.

FIG. 6B is a diagram illustrating an example of the flight plan generated by the flight plan generation unit 11c. As illustrated in this drawing, the flight plan generation unit 11c uses the intra-regional waypoint list (see FIG. 5C) and the boundary waypoint list (see FIG. 5A) selected by the selection unit 11b to generate a flight plan for each of the UAVs 1a and 1b. For example, the flight plan generation unit 11c may synthesize the intra-regional waypoint list (first partial path) and the boundary waypoint list (second partial path). The flight plan generation unit 11c may connect the boundary waypoint list in succession as many times as the UAVs 1a and 1b make a round trip on the flight path along the boundary. By this process of the flight plan generation unit 11c, it is possible to realize the movement of the UAVs 1a and 1b to fly in the area defined within the expected damage area and then fly along the safety boundary described with reference to FIG. 3B.

The flight plan generation unit 11c may generate a flight plan based on the predicted arrival time of tsunami. For example, the flight plan generation unit 11c may generate a flight plan (FIG. 6B) including the flight path illustrated in the intra-regional waypoint list (FIG. 5C), when there remains time until the predicted arrival time of tsunami. On the other hand, when there is no time until the predicted arrival time of tsunami, the flight plan generation unit 11c may generate a flight plan (FIG. 6A) that includes only the flight path along the safety boundary, without including the flight path illustrated in the intra-regional waypoint list (FIG. 5C).

For example, when a difference between time (T2) from a predetermined time (for example, from the time when the predicted tsunami information is received from the tsunami prediction system 200) to the predicted arrival time of tsunami and time (T1) required for flight within the expected damage area is greater than a threshold value (Tth), that is, when T2−T1>Tth is satisfied, the flight plan generation unit 11c may generate a flight plan (FIG. 6B) including the flight path illustrated in the intra-regional waypoint list (FIG. 5C). Conversely, when T2−T1>Tth is not satisfied, the flight plan generation unit 11c may generate a flight plan (FIG. 6A) including only the flight path along the safety boundary.

The threshold value (Tth) described above may vary with initial positions of the UAVs 1a and 1b and models of the UAVs 1a and 1b (the initial positions of the UAVs 1a and 1b are the positions of the waiting facilities Sa and Sb in the examples illustrated in FIGS. 3A and 3B). For example, when the distance between the flight area (residential area or commercial area in the examples of FIGS. 3A and 3B) defined within the expected damage area and the initial positions of the UAVs 1a and 1b is small, the threshold value (Tth) may be smaller than when the distance is large. Further, when the maximum speed of the UAVs 1a and 1b is high, the threshold value (Tth) may be smaller than when the maximum speed is low.

As illustrated in FIG. 5C, each intra-regional waypoint list may include a path (leading flight path) from the flight path within the expected damage area toward the flight path along the safety boundary (for example, the paths R1a and R1b illustrated in FIG. 3C). Such a leading flight path may be defined along an evacuation path (evacuation way) suitable for the evacuees to take. According to the intra-regional waypoint list, as described with reference to FIG. 3C, the UAVs 1a and 1b can lead evacuees within the expected damage area toward the safety boundary.

As illustrated in FIG. 5C, the flight speed associated with the position indicating the leading flight path may be different from the flight speed defined for other flight paths. For example, the flight speed on the leading flight path may be lower than the flight speed on another flight path (for example, on the flight path along the safety boundary). Accordingly, the UAVs 1a and 1b in the leading flight from the flight path within the expected damage area toward the flight path along the safety boundary can appropriately lead the evacuees.

As illustrated in FIG. 5C, even in the intra-regional waypoint list, some waypoints may be set to have lower flight speeds than other waypoints (in FIG. 5C, a plurality of waypoints with low flight speeds are illustrated as the PRIORITY FLIGHT RANGE). Since such an intra-regional waypoint list is used, as illustrated in FIG. 6A, the flight speeds at some waypoints are lower than the flight speeds at other waypoints in the flight plan. That is, the UAVs 1a and 1b will fly at some positions within the expected damage area with priority over the other positions. The position where the flight speed is low may be an area where it is estimated that there are many evacuees, for example. Accordingly, it is possible to effectively guide evacuation for the evacuees.

The storage unit 12 stores airframe information, which is information on the UAVs 1a and 1b. FIG. 5D is a diagram illustrating an example of the airframe information. As illustrated in FIG. 5D, the airframe information may include information indicating the visibility (degree of conspicuity) of the UAVs 1a and 1b. In the example illustrated in FIG. 5D, the visibility of the UAVs 1a and 1b is illustrated in three stages. The visibility level may be set based on the color and size of the UAVs 1a and 1b in advance.

The flight plan generation unit 11c may generate a flight plan based on the visibility of the UAVs 1a and 1b. For example, the flight plan generation unit 11c may correct the flight altitude specified in the boundary waypoint list (FIG. 5A) described above or the flight altitude specified in the intra-regional waypoint list (FIG. 5C) based on the visibility of the UAVs 1a and 1b. For example, for the UAVs 1a and 1b with relatively high visibility, the flight altitude may be corrected in the direction of raising altitude. On the contrary, for the UAVs 1a and 1b with relatively low visibility, the flight altitude may be corrected in the direction of lowering altitude. In the examples illustrated in FIGS. 6A and 6B, a is added as a correction value to the flight altitude specified in the boundary waypoint list (FIG. 5A) and the flight altitude specified in the intra-regional waypoint list (FIG. 5C).

As illustrated in FIG. 5D, the airframe information stored in the storage unit 12 includes information (waiting facility ID) representing the facility (waiting facility) in which the UAVs 1a and 1b are installed. The storage unit 12 also stores position information (waypoints) of each waiting facility ID. The flight plan generation unit 11c may generate a flight plan by using the position information obtained from the waiting facility ID. For example, the flight plan generation unit 11c generates a flight plan (FIG. 6B) including a path from the waiting facility to the flight path within the expected damage area, or a flight plan (FIG. 6A) including a path from the waiting facility to the flight path along the safety boundary.

As illustrated in FIG. 5D, the airframe information stored in the storage unit 12 may include information (return facility ID) representing a facility (return facility) where the UAVs 1a and 1b need to return. The storage unit 12 also stores position information (waypoints) of each return facility ID. The flight plan generation unit 11c may generate a flight plan by using the position information obtained from the return facility ID. For example, the flight plan generation unit 11c may generate a flight plan including a path from the flight path along the safety boundary to the return facility. The waiting facility and the return facility may be the same or different from each other.

Guidance Generation Unit

The storage unit 12 stores information (template information) that is the basis of guidance announced by the UAVs 1a and 1b. FIG. 5E is a diagram illustrating an example of the template information. As illustrated in FIG. 5E, in the template information, text information of the guidance message is associated with a message ID. In the example illustrated in FIG. 5E, the text information of "message ID: 101" is a template for informing the predicted arrival time of tsunami and the predicted arrival area, for example. The guidance generation unit 11d generates a guidance message (text information) based on the template of "message ID: 101", the predicted arrival time information of tsunami included in the predicted tsunami information, and the predicted arrival area information.

Further, the storage unit 12 stores guidance messages announced by the UAVs 1a and 1b. FIG. 5F is a diagram illustrating examples of the guidance message. As illustrated in FIG. 5F, the guidance messages include a message (text information) for guiding the evacuation center, for example. The guidance message may include a message (text information) for guiding the direction of evacuation. In the example illustrated in FIG. 5F, the direction of evacuation is indicated by the name of a hill region. The guidance generation unit 11d generates voice data from these guidance messages (text information).

The storage unit 12 stores information that associates the flight paths of the UAVs 1a and 1b with the guidance message ID. For example, as illustrated in FIGS. 5A and 5C, in the flight path basic information, a plurality of waypoints indicating a flight path and the guidance message ID may be associated with each other. As illustrated in FIGS. 6A and 6B, in the flight plan generated by the flight plan generation unit 11c, the waypoint indicating the flight path and the message ID may be associated with each other.

The flight plan generation unit 11c transmits the generated flight plan to the UAVs 1a and 1b through the communication unit 13. Further, the guidance generation unit 11d transmits the voice data of the generated message to the UAVs 1a and 1b through the communication unit 13. The UAVs 1a and 1b output a message (voice data) of the guidance message ID from the informing unit 7 (speaker) while flying according to the flight plan.

Note that the guidance message is not limited to the examples described above. For example, the guidance message may include a message indicating that the position of the corresponding aircraft represents the direction of evacuation (in the example of FIG. 5C, "Please evacuate to a higher location than here"). In this case, the guidance generation unit 11d may generate the voice data of this message and transmit the voice data to the UAVs 1a and 1b through the communication unit 13.

As described above, each intra-regional waypoint list (FIG. 5C) for realizing flight within the expected damage area includes the path from the flight path within the expected damage area toward the flight path along the safety boundary (leading flight path). The guidance message may include a message issued in this leading flight path. Specifically, the guidance message may include a message indicating that the direction in which the corresponding aircraft is flying is the direction to evacuate. In the example illustrated in FIG. 5F, the guidance message includes "Please evacuate toward here". In this case, the guidance generation unit 11d generates the voice data of this message and transmits the voice data to the UAVs 1a and 1b via the communication unit 13. In the flight plan, the message ID of this message may be associated with the waypoints indicating the leading flight path.

As illustrated in FIGS. 5A and 5C, the guidance message ID defined in the boundary waypoint list (FIG. 5C) for realizing flight along the safety boundary, and the guidance message ID defined in the intra-regional waypoint list (FIG. 5C) for realizing flight within the expected damage area may be different from each other. Accordingly, different guidances are announced, depending on whether it is the flight within the expected damage area or the flight along the safety boundary. For example, when flying along the safety boundary, the predicted arrival time of tsunami and the name of the evacuation center are announced. Meanwhile, when flying within the expected damage area, not only the predicted arrival time of tsunami and the name of the evacuation center, but also the information indicating the direction to evacuate (for example, the name of the hill region) may be announced. Accordingly, the evacuees who are still within the expected damage area can easily confirm the direction to evacuate.

Flight Monitoring Unit

When the UAVs 1a and 1b are in flight, the flight monitoring unit 11e acquires information on the flight and status of the UAVs 1a and 1b and information on the surroundings of the UAVs 1a and 1b through the communication unit 13, from the UAVs 1a and 1b. The information on the flight and status of the UAVs 1a and 1b is, for example, the outputs of the sensor group 5 of the UAVs 1a and 1b, and specifically, the outputs of a flight position sensor (e.g., GNSS sensor), an altitude sensor (specifically, barometric pressure sensor), a posture sensor (e.g., acceleration sensor and/or angular velocity sensor), a geomagnetic sensor, and the like. In addition, the information on surroundings of the UAVs 1a and 1b is image data acquired by the image capturing unit 4.

The flight monitoring unit 11e determines whether or not the flight of the UAVs 1a and 1b is normal based on the information received from the UAVs 1a and 1b. When the flight monitoring unit 11e determines that an abnormality occurs in the UAVs 1a and 1b, the flight monitoring unit 11e may transmit instructions to land to the UAVs 1a and 1b.

As illustrated in FIG. 4, the flight plan generation unit 11c may include an unevacuated person determination unit 11f. The unevacuated person determination unit 11f may determine the presence or absence of an unevacuated person based on the image data received from the UAVs 1a and 1b through the communication unit 13, when the UAVs 1a and 1b are flying within the expected damage area. For example, the unevacuated person determination unit 11f may compare a plurality of pieces of image data in succession in time and determine the presence or absence of a moving person or vehicle.

When the unevacuated person determination unit 11f determines that there is no unevacuated person, the flight plan generation unit 11c may update the flight plan previously transmitted to the UAVs 1a and 1b. For example, the flight plan generation unit 11c may update the flight plan so as to stop the flight within the expected damage area in the middle and start flying toward the flight path selected by the selection unit 11b. Specifically, the flight plan generation unit 11c may newly generate a flight plan including the flight path from the current position of the UAVs 1a and 1b to the safety boundary and the flight path along the safety boundary, and transmit this flight plan to the UAVs 1a and 1b. Upon receiving the new flight plan, the UAVs 1a and 1b may start flying according to this flight plan.

Flowchart

FIG. 7A is a flowchart illustrating an example of a process executed by the control system 10 and a process executed by the UAVs 1a and 1b. FIG. 7B is a flowchart illustrating an example of a process executed in the flight control (S109) of the UAVs 1a and 1b illustrated in FIG. 7A. Although FIG. 7B illustrates the process executed by the control system 10 and the first UAV 1a, the same process is also executed by the control system 10 and the second UAV 1b.

As illustrated in FIG. 7A, when the predicted tsunami information acquisition unit 11a acquires the predicted tsunami information from the tsunami prediction system 200 through the communication unit 13 (S101), the selection unit 11b selects a flight path according to the predicted tsunami scale with reference to "tsunami scale-to-flight path information" (FIG. 5B) (S102).

Further, the flight plan generation unit 11c determines whether or not there is time to guide evacuation within the expected damage area until the predicted arrival time of tsunami (S103). For example, the flight plan generation unit 11c determines whether or not the difference between the time (T2) from the time when the predicted tsunami information is received from the tsunami prediction system 200 to the predicted arrival time of tsunami and the time (T1) required for flight within the expected damage area is greater than the threshold value (Tth). That is, the flight plan generation unit 11c determines whether or not T2−T1>Tth is satisfied. When there is the time for guiding evacuation within the expected damage area, for example, when T2−T1>Tth is satisfied, the flight plan generation unit 11c generates the flight plan (FIG. 6B) including the flight path (FIG. 5C) within the expected damage area and the flight path along the safety boundary for each of the UAVs 1a and 1b (S104). Meanwhile, when there is no time for guiding evacuation within the expected damage area, for example, when T2−T1>Tth is not satisfied, the flight plan generation unit 11c generates the flight plan (FIG. 6A) that includes only the flight path along the safety boundary, without including the flight path illustrated by the flight path (FIG. 5C) within the expected damage area for each of the UAVs 1a and 1b (S105).

Further, the guidance generation unit 11d refers to the template information (FIG. 5E) and generates a guidance message based on the predicted arrival time of tsunami and the predicted arrival area of tsunami (S106). The guidance generation unit 11d generates the voice data of the guidance message generated in S106 and the guidance message included in the guidance message information (FIG. 5F) (S107).

The guidance generation unit 11d and the flight plan generation unit 11c transmit the voice data of the guidance message and the flight plan to each of the UAVs 1a and 1b (S108). Then, the control system 10 executes flight control for each of the UAVs 1a and 1b (S109).

As illustrated in FIG. 7B, the control unit 9 of the UAV 1a determines whether or not the flight plan and the voice data of the guidance message are received (S201). Upon receiving the flight plan and the voice data of the guidance message, the control unit 9 stores the flight plan and the voice data in the storage unit 2 (S202). Then, the control unit 9 drives the drive unit 6 to cause the UAV 1a to fly according to the flight plan (S203). That is, the control unit 9 controls the drive unit 6 such that the corresponding aircraft flies along the flight path (waypoints) included in the flight plan. Further, the control unit 9 outputs a guidance message corresponding to the current position (current waypoint) from the informing unit (speaker) 7 while referring to the guidance message ID included in the flight plan (S203). The control unit 9 transmits information indicating the flight status, specifically, the image data acquired by the image capturing unit 4 and the current position information to the control system 10 (S204).

The control unit 9 of the UAV 1a determines whether or not the corresponding aircraft arrives at the end position of the flight path (S205). When the corresponding aircraft does not arrive at the end position of the flight path, the control unit 9 returns to the process of S201. The control unit 9 repeatedly executes the processes of S201 to S205 until the corresponding aircraft arrives at the end position of the flight path. Meanwhile, when it is determined in S205 that the corresponding aircraft arrives at the end position of the flight path, the control unit 9 transmits a signal indicating that the corresponding aircraft arrives at the end position of the flight path to the control system 10 (S206) and ends the process.

In the control system 10, upon receiving the information indicating the flight status such as image data and the like from the UAV 1a, the flight plan generation unit 11c determines whether or not the flight plan needs to be updated (S207). For example, when the UAV 1a is flying within the expected damage area, the flight plan generation unit 11c (the unevacuated person determination unit 11f) compares a plurality of successive image data to determine whether or not there is an unevacuated person in the vicinity. When there is no unevacuated person already, the flight plan generation unit 11c determines that the flight plan needs to be updated, and generates a new flight plan (S208). For example, the flight plan generation unit 11c updates the flight plan so as to stop the flight within the expected damage area in the middle and start flying toward the flight path selected by the selection unit 11b. Then, the flight plan generation unit 11c transmits the generated flight plan to the UAV 1a. In S207 and S208, a new guidance message may be generated, and the voice data of the guidance message may be transmitted to the UAV 1a.

When it is not determined in S207 that the flight plan needs to be updated, the control unit 11 of the control system 10 determines in S210 whether or not a signal indicating that the UAV 1a arrives at the end position is received from the UAV 1a. The control unit 11 repeatedly executes the processes of S207 to S209 until the signal indicating that the UAV 1a arrives at the end position is received from the UAV 1a. When the control unit 11 receives the signal indicating that the UAV 1a arrives at the end position from the UAV 1a in S210, the control unit 11 ends the process (S109, FIG. 7A) for controlling the flight of the UAV 1a.

When the UAV 1a receives a new flight plan from the control system 10 as a result of the process of S209 of the control system 10, the new flight plan is stored in the storage unit 2 of the UAV 1a (S201 and S202). Then, the control unit 9 of the UAV 1a executes the flight according to the new flight plan (S203). The example of the process executed by the control system 10 and the process executed by the UAVs 1a and 1b is described above.

SUMMARY (1) As described above, the control system 10 includes the predicted tsunami information acquisition unit 11a that acquires the predicted tsunami information, the flight plan generation unit 11c that generates the flight plan for the unmanned aerial vehicle UAVs 1a and 1b including flight paths (for example, paths R1a and R1b, see FIGS. 3A and 3B) along the safety boundaries (for example, boundaries L1a and L1b, see FIGS. 3A and 3B) between the expected damage area which is the area expected to be damaged by the tsunami from which the predicted tsunami information is acquired and the safe area which is safe from damage, and the communication unit 13 that transmits the flight plan to the UAVs. According to the system 10, it is possible to guide the evacuees as to up to which position (height) the evacuees need to evacuate.

(2) As illustrated in FIGS. 3C and 6A, the example of the flight path includes the forward flight path in which the UAVs 1a and 1b fly forward along the safety boundaries and the reverse flight path in which the UAVs 1a and 1b fly in the reverse direction along the safety boundaries. Accordingly, it is possible to more effectively guide the evacuees as to up to which position the evacuees need to evacuate.

(3) As illustrated in FIG. 3C, the forward flight path and the reverse flight path pass through the same position along the safety boundary, for example.

(4) As illustrated in FIG. 3D, the forward flight path and the reverse flight path pass through different positions, for example.

(5) As illustrated in FIG. 3E, the flight plan may include hovering at a position along the safety boundary.

(6) As illustrated in FIGS. 3C, 3D, 6A, and 6B, the flight path includes the first position and the second position having different flight priorities, and the flight plan generation unit 11c may generate a flight plan such that the flight speed at the first position and the flight speed at the second position are different from each other. Accordingly, it is possible to inform evacuation at a position where it is highly necessary to inform the guidance of evacuation (for example, areas with many evacuees), and to effectively guide the evacuees to a position suitable for evacuation (a position near the evacuation center).

(7) As illustrated in FIG. 6B, the flight path may include a flight path defined within the expected damage area (first partial path) and a flight path along the safety boundary (second partial path). Accordingly, even when flying within the expected damage area, it is possible to inform the evacuees of the need for evacuation.

(8) The guidance announced in the flight path (first partial path) defined within the expected damage area and the guidance announced in the flight path (second partial path) along the safety boundary may be different from each other. Accordingly, it is possible to inform a guidance suitable for each partial path.

(9) The flight plan generation unit 11c may generate a flight plan based on the predicted arrival time of tsunami included in the predicted tsunami information. Accordingly, for example, it is possible to make a difference between the flight plan when there is no time until the predicted arrival time of tsunami and the flight plan when there remains time until the predicted arrival time of tsunami.

(10) The flight plan generation unit 11c may update the flight plan based on the image data acquired by the image capturing units 4 mounted on the UAVs 1a and 1b. Accordingly, during the flight of the UAVs 1a and 1b, the flight plan can be optimized according to the surrounding conditions of the UAVs 1a and 1b.

(11) The control system 10 includes the storage unit 12 storing a plurality of candidate paths (R1a to R3a and R1b to R3b, see FIG. 5A) respectively corresponding to the plurality of tsunami scales. The flight plan generation unit 11c may generate a flight plan for the UAVs based on the candidate path corresponding to the tsunami scale indicated by the predicted tsunami information.

(12) The control system 10 is a system that controls the first UAV 1a and the second UAV 1b, each of which includes the informing unit 7 (speaker). The flight plan generation unit 11c generates a first flight plan for transmission to the first UAV 1a based on the predicted tsunami information, and generates a second flight plan for transmission to the second UAV 1b based on the predicted tsunami information. Accordingly, it is possible to effectively guide evacuation in a wide range.

(13) The control system 10 includes the storage unit 12 storing information (FIG. 5D) indicating the visibility of the airframes of the plurality of the UAVs 1a and 1b. The flight plan may include altitude information on which each of the UAVs 1a and 1b flies. The flight plan generation unit 11c generates altitude information based on the information on airframes. For example, the flight plan generation unit 11c may correct the flight altitude defined by the intra-regional waypoint list and the boundary waypoint list. Accordingly, for example, it is possible to guide the evacuees in a wide range to evacuate, by flying the UAVs 1a and 1b with high visibility to a high position.

(14) A control method for the UAVs 1a and 1b described above includes a predicted tsunami information acquisition step of acquiring predicted tsunami information, a flight plan generation step of generating the flight plan for the UAVs 1a and 1b including flight paths (for example, paths R1a and R1b, see FIG. 3A) along the safety boundaries between the expected damage area which is the area expected to be damaged by the tsunami from which the predicted tsunami information is acquired and the safe area which is safe from damage, and a communication step of transmitting the flight plan to the UAVs 1a and 1b. According to the control method, it is possible to guide the evacuees as to up to which position (height) the evacuees need to evacuate.

(15) A program proposed in the present disclosure is a program for causing a computer to function as a device which controls the UAVs 1a and 1b including the informing units 7 that guide evacuation from tsunami by emitting a voice. The program causes the computer to function as the predicted tsunami information acquisition unit 11a that acquires the predicted tsunami information, the flight plan generation unit 11c that generates the flight plan for the UAVs 1a and 1b including flight paths (for example, paths R1a and R1b, see FIG. 3A) along the safety boundaries between the expected damage area which is the area expected to be damaged by the tsunami from which the predicted tsunami information is acquired and the safe area which is safe from damage, and the communication unit 13 that transmits the flight plan to the UAVs 1a and 1b. According to the program, it is possible to guide the evacuees as to up to which position (height) the evacuees need to evacuate.

Modification

The control system proposed in the present disclosure is not limited to the control system 10 described above. For example, in the example described above, the UAVs 1a and 1b include the speakers as the informing units 7, and the control system 10 generates the voice data of the guidance message output from the informing units 7 and transmits the voice data to the UAVs 1a and 1b. The UAVs 1a and 1b may include light emitting units including LEDs as the informing units 7 together with, or instead of the speakers. The UAVs 1a and 1b may fly along the flight path along the safety boundary while emitting light through the light emitting units.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A control system for an unmanned aerial vehicle comprising:
    at least one processor, wherein
    the at least one processor
        acquires predicted tsunami information;
        generates a flight plan for the unmanned aerial vehicle, the flight plan including a flight path along a boundary between an expected damage area and a safe area, the expected damage area being expected to be damaged by a tsunami indicated by the predicted tsunami information, the safe area being expected to be safe from damage caused by the tsunami;
        transmits the flight plan to the unmanned aerial vehicle; and
        controls the unmanned aerial vehicle including an informing unit to guide evacuation from the tsunami by emitting at least one of voice and light.

2. The control system according to claim 1, wherein the flight path includes a forward flight path in which the unmanned aerial vehicle flies along the boundary in a first direction, and a reverse flight path in which the unmanned aerial vehicle flies along the boundary in a second direction opposite to the first direction.

3. The control system according to claim 2, wherein the forward flight path and the reverse flight path pass through a same position along the boundary.

4. The control system according to claim 2, wherein the forward flight path and the reverse flight path pass through different positions.

5. The control system according to claim 1, wherein the flight plan includes hovering at a position along the boundary.

6. The control system according to claim 1, wherein the flight path includes a first position and a second position having priorities in flight different from each other, and
the at least one processor generates the flight plan such that a flight speed at the first position and a flight speed at the second position are different from each other.

7. The control system according to claim 1, wherein the flight path includes a first partial path defined within the expected damage area and a second partial path including the flight path along the boundary.

8. The control system according to claim 7, wherein a guidance announced in the first partial path and a guidance announced in the second partial path are different from each other.

9. The control system according to claim 7, wherein the at least one processor generates the flight plan based on a predicted arrival time of tsunami indicated by the predicted tsunami information.

10. The control system according to claim 7, wherein the at least one processor updates the flight plan based on an image acquired by an image capturing unit mounted on the unmanned aerial vehicle.

11. The control system according to claim 1, further comprising a storage device that stores a plurality of candidate paths corresponding to a plurality of tsunami scales, respectively, wherein
the at least one processor generates a flight plan for the unmanned aerial vehicle based on the candidate path corresponding to a scale of the tsunami indicated by the predicted tsunami information.

12. The control system according to claim 1, wherein the control system controls a first unmanned aerial vehicle and a second unmanned aerial vehicle, each of which includes the informing unit, and
the at least one processor generates a first flight plan to be transmitted to the first unmanned aerial vehicle based on the predicted tsunami information, and generates a second flight plan to be transmitted to the second unmanned aerial vehicle based on the predicted tsunami information.

13. The control system according to claim 1, wherein the control system includes at least one storage device that stores information indicating visibility of a plurality of unmanned aerial vehicles,
the flight plan includes information on altitude where each unmanned aerial vehicle flies, and
the at least one processor generates the information on altitude based on the information on airframes.

14. A control method for an unmanned aerial vehicle comprising:
    acquiring predicted tsunami information;
    generating a flight plan for the unmanned aerial vehicle, the flight plan including a flight path along a boundary between an expected damage area and a safe area, the expected damage area being expected to be damaged by a tsunami indicated by the predicted tsunami information, the safe area being expected to be safe from damage caused by the tsunami;
    transmitting the flight plan to the unmanned aerial vehicle; and
    controlling the unmanned aerial vehicle including an informing unit to guide evacuation from the tsunami by emitting at least one of voice and light.

15. A non-transitory information storage medium storing a program for causing a computer to:
    acquire predicted tsunami information,
    generate a flight plan for the unmanned aerial vehicle, the flight plan including a flight path along a boundary between an expected damage area and a safe area, the expected damage area being expected to be damaged by a tsunami indicated by the predicted tsunami information, the safe area being expected to be safe from damage caused by the tsunami,
    transmit the flight plan to the unmanned aerial vehicle; and
    control the unmanned aerial vehicle including an informing unit to guide evacuation from the tsunami by emitting at least one of voice and light.

16. The control system according to claim 1, wherein the flight path is specifically along the boundary between the expected damage area and the safe area.

* * * * *